(12) United States Patent
Tao et al.

(10) Patent No.: US 12,278,330 B2
(45) Date of Patent: Apr. 15, 2025

(54) LITHIUM-ION BATTERY HAVING DESIRABLE SAFETY PERFORMANCE

(71) Applicant: NINGDE AMPEREX TECHNOLOGY LIMITED, Ningde (CN)

(72) Inventors: Tao Tao, Ningde (CN); Ming Liang Mo, Ningde (CN)

(73) Assignee: NINGDE AMPEREX TECHNOLOGY LIMITED, Fujian (CN)

(*) Notice: Subject to any disclaimer, the term of this patent is extended or adjusted under 35 U.S.C. 154(b) by 0 days.

(21) Appl. No.: 18/532,841

(22) Filed: Dec. 7, 2023

(65) Prior Publication Data

US 2024/0113324 A1  Apr. 4, 2024

Related U.S. Application Data (63) Continuation of application No. 17/746,755, filed on May 17, 2022, now Pat. No. 11,923,498, which is a
(Continued)

(30) Foreign Application Priority Data

Jan. 17, 2014 (CN) .......................... 201420030319.4

(51) Int. Cl.
*H01M 10/0525* (2010.01)
*H01M 4/13* (2010.01)
(Continued)

(52) U.S. Cl.
CPC ......... *H01M 10/0525* (2013.01); *H01M 4/13* (2013.01); *H01M 4/139* (2013.01);
(Continued)

(58) Field of Classification Search
CPC ............ H01M 50/538; H01M 50/536; H01M 50/593; H01M 50/595; H01M 50/59
See application file for complete search history.

(56) References Cited

U.S. PATENT DOCUMENTS

| 5,154,993 A | 10/1992 | Beatty |
| 8,309,880 B2 | 11/2012 | Chung |
(Continued)

FOREIGN PATENT DOCUMENTS

| CN | 102187497 A | 9/2011 |
| CN | 102694148 A | 9/2012 |
(Continued)

OTHER PUBLICATIONS

JP2014225326 English Translation. Sugita et al. Japan. Dec. 4, 2014. (Year: 2014).*
(Continued)

*Primary Examiner* — Christopher P Domone
(74) *Attorney, Agent, or Firm* — Morgan, Lewis & Bockius LLP (57) ABSTRACT

A lithium-ion battery including a positive electrode, a negative electrode, a separator disposed between the positive electrode and the negative electrode, and an electrolyte. The positive electrode includes a positive current collector and a positive electrode active material layer containing lithium cobalt oxide formed on the positive current collector. The positive electrode active material layer is provided with a first recess accommodating a positive lead coupled with the positive current collector and disposed on a surface of the positive current collector facing a center of the battery. The negative electrode includes a negative current collector and a negative electrode active material layer containing graphite or silicon formed on the negative current collector. The negative electrode active material layer is provided with a second recess accommodating a negative lead coupled with
(Continued)

the negative current collector and disposed on a surface of the negative current collector facing away from the center of the battery.

20 Claims, 4 Drawing Sheets

Related U.S. Application Data continuation of application No. 17/407,081, filed on Aug. 19, 2021, which is a continuation of application No. 16/113,938, filed on Aug. 27, 2018, now abandoned, which is a continuation of application No. 14/596,873, filed on Jan. 14, 2015, now Pat. No. 10,541,441.

(51) Int. Cl.
*H01M 4/139* (2010.01)
*H01M 10/058* (2010.01)
*H01M 50/536* (2021.01)
*H01M 50/538* (2021.01)

(52) U.S. Cl.
CPC ....... *H01M 10/058* (2013.01); *H01M 50/536* (2021.01); *H01M 50/538* (2021.01)

(56) References Cited

U.S. PATENT DOCUMENTS

| | | | | |
|---|---|---|---|---|
| 2006/0051662 A1* | 3/2006 | Kwak | ............... | H01M 10/0431 429/130 |
| 2012/0052331 A1* | 3/2012 | Park | .................. | H01M 50/528 429/7 |
| 2015/0171396 A1* | 6/2015 | Okuno | .................. | B60L 58/26 701/22 |

FOREIGN PATENT DOCUMENTS

| | | | |
|---|---|---|---|
| CN | 202423456 U | | 9/2012 |
| CN | 202585621 U | | 12/2012 |
| CN | 203733894 U | | 7/2014 |
| CN | 104157914 A | | 11/2014 |
| CN | 108352492 B | | 8/2021 |
| JP | H065275 A | | 1/1994 |
| JP | H0620707 A | | 1/1994 |
| JP | 4380201 B2 | | 12/2009 |
| JP | 2014225326 | * | 12/2014 |
| WO | WO2016/197382 A1 | | 12/2016 |
| WO | WO2017035749 A1 | | 3/2017 |

OTHER PUBLICATIONS

Official filing receipt of Invalidation Request, ZL201580082766.1, Jan. 24, 2024, 10 pgs.
Notification of forwarding documents Invalidity Request, ZL201580082766.1, Mar. 12, 2024, 77 pgs.
Evidence document 2, Zhang Fei, Research on UV laser micromachining technology and mechanism of electronic materials, Huazhong University of Science & Technology, May 2012, 129 pgs.
Evidence document 3, Yang Shichun, et al., Surface quality and finishing technology, 15 pgs.
Evidence document 4, Guan Yuming, et al., Machinery Design & Manufacture, School of Mechanical and Power Engineering, East China University of Science and Technology, Shanghai, Jan. 2009, 4 pgs.
Evidence document 13, Qi Yie, Study on Improving Non-fluid Lubrication Performance by Surface Texturing, Mar. 2014, 83 pgs.
Evidence document 14, XiangXin et al., Influence of Dimple Texture on Tribological Behavior of Line Contact Friction Pairs, China Surface Engineering, China Surface Engineering, vol. 28, No. 4, Aug. 2015, 11 pgs.
Evidence document 17, The prosecution history of the counterpart Chinese application 2015800827661, provided by CNIPA, 176 pgs.
Scientific Background on the Nobel Prize in Chemistry 2019, Lithium-Ion Batteries, The Royal Swedish Academy of Sciences, Oct. 9, 2019, 14 pgs.

\* cited by examiner

LITHIUM-ION BATTERY HAVING DESIRABLE SAFETY PERFORMANCE

CROSS-REFERENCE TO RELATED APPLICATION

The present application is a continuation of U.S. patent application Ser. No. 17/746,755, entitled "LITHIUM-ION BATTERY HAVING DESIRABLE SAFETY PERFORMANCE", filed May 17, 2022, which is a continuation of U.S. patent application Ser. No. 17/407,081, entitled "LITHIUM-ION BATTERY HAVING DESIRABLE SAFETY PERFORMANCE", filed Aug. 19, 2021, which is a continuation of U.S. patent application Ser. No. 16/113,938, entitled "LITHIUM-ION BATTERY HAVING DESIRABLE SAFETY PERFORMANCE", filed Aug. 27, 2018, which is a continuation of U.S. patent application Ser. No. 14/596,873, entitled "LITHIUM-ION BATTERY HAVING DESIRABLE SAFETY PERFORMANCE", filed Jan. 14, 2015, which claims priority to Chinese Patent Application No. 201420030319.4, entitled "LITHIUM-ION BATTERY HAVING DESIRABLE SAFETY PERFORMANCE", filed Jan. 17, 2014, all of which are hereby incorporated by reference in their entirety.

TECHNICAL FIELD

The present disclosure generally relates to lithium-ion batteries and, more particularly, relates to a lithium-ion battery having desirable safety performance.

BACKGROUND

At present, lithium-ion batteries are required to be thinner and thinner as well as have higher and higher energy density, which demands a lithium-ion battery has as much energy as possible in a volume as small as possible.

In conventional design of a lithium-ion battery, a lead is a component soldered on a current collector to conduct current. Arrangement of the lead will increase the thickness of the lithium-ion battery no matter the lithium-ion battery adopts a Jelly-roll structure or a laminated structure. In other words, the area where the lead is soldered to the current collector has a largest thickness in the lithium-ion battery. The increased thickness due to the lead is about 1-5% of the thickness of an assembled lithium-ion battery. Therefore, increase of thickness of a lithium-ion battery due to the lead has become one of the key actors which limit the energy density of the lithium-ion battery.

Chinese patent publication numbers CN 202495523U and CN 201087907Y each discloses a lithium-ion battery which defines a recess on a positive plate and/or the negative plate to receive a lead therein. The arrangement of the recess on the positive plate and/or the negative plate can reduce the thickness of the lithium-ion battery. However, when the recess is defined at one end of the positive plate or the negative plate along a length direction thereof, thickness variation around the recess is much larger than the thickness variation of the film afar from the recess. Particularly, the arrangement of the recess may generate a number of corners. The film around the corners is readily peeled off, especially when the negative active material adopts an expansive substance, such as silicon. The structure as previously described may lead to a high internal resistance of the lithium-ion battery and affect the capacity of the lithium-ion battery. In addition, there is no insulating layer provided on the positive area corresponding to the positive recess or the negative recess, internal short circuit and lithium precipitation may potentially occur to the lithium-ion battery, which will inevitably affect the safety performance of the lithium-ion battery.

In view of the foregoing, what is needed, therefore, is to provide a lithium-ion battery having desirable safety performance.

SUMMARY

One object of the present disclosure is to provide a battery which has high energy density and desirable safety performance.

According to an embodiment of the present disclosure, a battery is provided and the battery includes: a first plate, comprising a first film and a first lead; a first insulating glue layer, disposed on a surface of the first lead; a second plate, comprising a second lead; in which a second insulating glue layer is disposed on a surface of the first film corresponding to the second lead.

According to an embodiment of the present disclosure, the first plate includes a first current collector, the first film and the first lead, the first film being disposed on the first current collector, the first lead being electrically connected with the first current collector, the first film includes: a first recess configured to receive the first lead; a second plate, comprising a second current collector, a second film and a second lead, the second film being disposed on the second current collector, the second lead being electrically connected with the second current collector, the second film being provided with a second recess configured to receive the second lead.

Specifically, the first plate is a positive plate, the first current collector is a positive current collector, the first film is a positive film, the first lead is a positive lead; the second plate is a negative plate, the second current collector is a negative current collector, the second film is a negative film, the second lead is a negative lead.

According to one embodiment of the present disclosure, a lithium-ion battery having desirable safety performance is provided. The lithium-ion battery includes:

a positive plate, including a positive current collector, a positive film formed on the positive current collector and a positive lead coupled to the positive current collector, the positive film being provided with a first recess and the positive lead being soldered in the first recess;

a negative plate, including a negative current collector, a negative film formed on the negative current collector and a negative lead coupled to the negative current collector, and the negative film being provided with a second recess and the negative lead being soldered in the second recess;

a separator disposed between the positive plate and the negative plate; and electrolyte, wherein upper and lower surfaces of the positive lead each is provided with a first insulating glue layer, a surface of the positive film corresponding to the second recess is pasted with a second insulating glue layer, and the first insulating glue layer formed on the lower surface of the positive lead entirely covers the blank positive current collector in the first recess.

According to an embodiment of the present disclosure, the positive lead is entirely seated in the first recess and the negative lead is entirely seated in the second recess. Due to the arrangement of the first recess on the positive plate and the second recess on the negative plate, the positive lead and the negative lead can be received in the first recess and the second recess respectively. Along the thickness direction, the thickness of the positive lead (negative lead) is less than the thickness of the positive plate (negative plate). Therefore, the lead will not induce thickness increase of the positive lead or the negative lead. There will be more space for the active material, and energy density of the lithium-ion battery is improved remarkably.

According to an embodiment of the present disclosure, the first recess or the second recess is defined via mechanical solvent cleaning or laser cleaning.

According to an embodiment of the present disclosure, the second insulating glue layer has a width larger than a width of the second recess, and the second insulating glue layer has a length larger than a length of the second recess.

According to an embodiment of the present disclosure, the first insulating glue layer or the second insulating glue layer is one of a green insulating glue layer, a black insulating glue layer, a white insulating glue layer or a yellow insulating glue layer.

According to an embodiment of the present disclosure, a distance between a center of the first recess and one end of the positive film is ¼ ~¾ of a length of the positive film, and a distance between a center of the second recess and one end of the negative film is ¼ ~¾ of a length of the negative film.

According to an embodiment of the present disclosure, the first recess and the second recess are defined in a middle portion of the positive plate and the negative plate respectively. Even though the positive plate and/or the negative plate expand, unstable bonding, large thickness variation or even abscission of the positive film or the negative film around the recess is avoided. At the same time, the internal resistance of the lithium-ion battery is reduced, and capacity and energy density of the lithium-ion battery are improved remarkably in the premise of unchanged battery cell size.

According to an embodiment of the present disclosure, a distance between a center of the first recess and one end of the positive film is half of a length of the positive film, and a distance between a center of the second recess and one end of the negative film is half of a length of the negative film.

According to an embodiment of the present disclosure, the first recess has a length 1~100 mm less than a length of the positive lead, the first recess has a width 1~10 mm larger than a width of the positive lead, the second recess has a length 1~100 mm less than a length of the negative lead, and the second recess has a width 1~10 mm larger than a width of the negative lead.

According to an embodiment of the present disclosure, the first recess has a length 1~100 mm less than a width of the positive film, and the second recess has a length 1~100 mm less than a width of the negative film.

According to an embodiment of the present disclosure, the first recess has a depth no larger than a thickness of the positive film, and the second recess has a depth no larger than a thickness of the negative film.

According to an embodiment of the present disclosure, the first recess has a depth 0.005~0.1 mm larger than a thickness of the positive lead, and the second recess has a depth 0.005~0.1 mm larger than a depth of the negative lead.

Compared with the prior art, due to the arrangement of the first insulating glue layer formed on the upper and lower surfaces of the positive lead and the second insulating glue layer pasted on the surface of the positive film corresponding to the second recess, occurrence of internal short circuit and lithium precipitation in the lithium-ion battery is remarkably reduced, and safety performance of the lithium-ion battery is improved remarkably in the premise of desirable energy density.

Other advantages and novel features will be drawn from the following detailed description of preferred embodiments with the attached drawings. The accompanying drawings, which are incorporated in and constitute a part of this specification, illustrate embodiments of the present disclosure and, together with a general description of the disclosure given above, and the detailed description of the embodiments given below, serve to explain the principles of the disclosure.

DETAILED DESCRIPTION

Example embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like reference numerals refer to like elements throughout.

According to an embodiment of the present disclosure, a battery is provided and the battery includes: a first plate, comprising a first film and a first lead; a first insulating glue layer, disposed on a surface of the first lead; a second plate, comprising a second lead; in which a second insulating glue layer is disposed on a surface of the first film corresponding to the second lead.

According to an embodiment of the present disclosure, the first plate includes a first current collector, the first film and the first lead, the first film being disposed on the first current collector, the first lead being electrically connected with the first current collector, the first film includes: a first recess configured to receive the first lead; a second plate, comprising a second current collector, a second film and a second lead, the second film being disposed on the second current collector, the second lead being electrically connected with the second current collector, the second film being provided with a second recess configured to receive the second lead.

Specifically, the first plate is a positive plate, the first current collector is a positive current collector, the first film is a positive film, the first lead is a positive lead; the second plate is a negative plate, the second current collector is a negative current collector, the second film is a negative film; the second lead is a negative lead.

Example 1

Referring to FIG. 1 to FIG. 5C, a lithium-ion battery according to one embodiment of the present disclosure includes a positive plate 1, a negative plate 2, a separator 3 disposed between the positive plate 1 and the negative plate 2, and electrolyte (not shown). The positive plate 1 includes a positive current collector 11, a positive film 12 provided on the positive current collector 11, and a positive lead 13. The negative plate 2 includes a negative current collector 21, a negative film 22 provided on the negative current collector 21, and a negative lead 23. The positive film 12 defines a first recess 14. The positive lead 13 is soldered and seated in the first recess 14. The negative film 22 defines a second recess 24. The negative lead 23 is soldered and seated in the second recess 24. An upper surface and a lower surface of the positive lead 13 each is formed with a first insulating glue layer 15. A surface of the positive film 12 corresponding to the second recess 24 is pasted with a second insulating glue layer 16.

The second insulating glue layer 16 has a width larger than a width of the second recess 24. The second insulating glue layer 16 has a length larger than a length of the second recess 24.

The first insulating glue layer 15 and the second insulating glue layer 16 are green insulating glue layers.

The distance between the center of the first recess 14 and one end of the positive film 12, i.e. one end of the positive film 12 perpendicular to a length direction of the positive current collector 11 and formed no blank positive current collector 11, is half of a length of the positive film 12. The distance between the center of the second recess 24 and one end of the negative film 22, i.e. one end of the negative film 12 perpendicular to a length direction of the negative current collector 21 and firmed no blank negative current collector 21, is half of a length of the negative film 22.

The first recess 14 has a length 25 mm less than a length of the positive lead 13. The first recess 14 has a width 4 mm larger than a width of the positive lead 13. The second recess 24 has a length 25 mm less than a length of the negative lead 23. The second recess has a width 4 mm larger than a width of the negative lead 23.

The first recess 14 has a length 55 mm less than a width of the positive film 13. The second recess 24 has a length 57 mm less than a width of the negative film 22.

The first recess 14 has a depth less than a thickness of the positive film 12. The second recess 24 has a depth less than a thickness of the negative film 22.

The first recess 14 has a depth 0.02 mm larger than a thickness of the positive lead 13. The second recess 24 has a depth 0.02 mm larger than a thickness of the negative lead 23.

Figure 1:
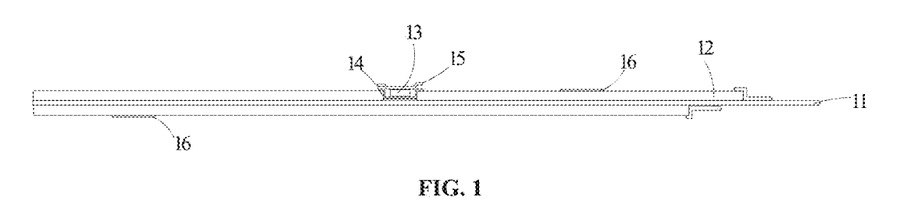
FIG. 1 depicts an exemplary front view of a positive plate of a lithium-ion battery according to one embodiment of the present disclosure.
Figure 3:
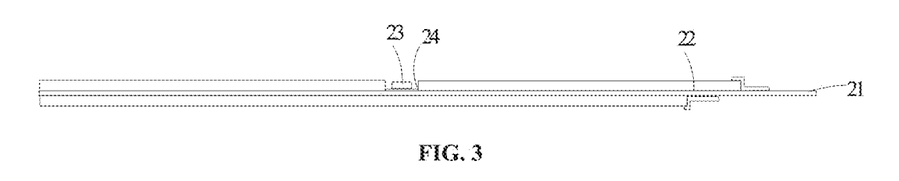
FIG. 3 depicts an exemplary top view of a positive plate of a lithium-ion battery according to one embodiment of the present disclosure.

A method for manufacturing a lithium-ion battery according to one embodiment of the present disclosure will be described in detail in view of a 303482 square lithium-ion battery (a lithium-ion battery having a thickness of 3.0 mm, a width of 34 mm and a length of 82 mm). The method for manufacturing a lithium-ion battery includes the steps of:

Preparation of the positive plate:
1) adding 95 wt % positive active material $LiCoO_2$, 2 wt % binder PVDF and 3 wt % conductive agent graphite into solvent NMP, obtaining a positive slurry having a viscosity of 3000-6000 pa·s after fully stirring;

2) coating the positive slurry on an aluminum foil having a thickness of 12 μm, and obtaining a positive plate 1 having a compacted density of 4.1 $g/cm^3$ and a length of 277 mm a width of 75 mm, a thickness of 0.114 mm after drying and cold pressing;

3) removing the positive film 12 at a center of the positive plate 1 (at a middle portion along a length direction of the positive plate 1) via, laser cleaning to define a first recess 14 having a thickness of 0.1 mm, a width of 10 mm and a length of 20 mm;

4) coupling a positive lead 13 having a thickness of 0.08 mm, a width of 6 mm and a length of 45 mm in the first recess 14 via laser welding, the positive lead 13 extending out of the positive plate 1 of about 15 mm;

5) providing green insulating glue layers on upper and lower surfaces of the positive lead 13, and pasting green insulating glue layer on the positive film 12 corresponding to the second recess 24 in winding, ensuring the green insulating glue layer on the lower surface of the positive lead 13 entirely covering the blank positive current collector 11 in the first recess 14.

Figure 2:
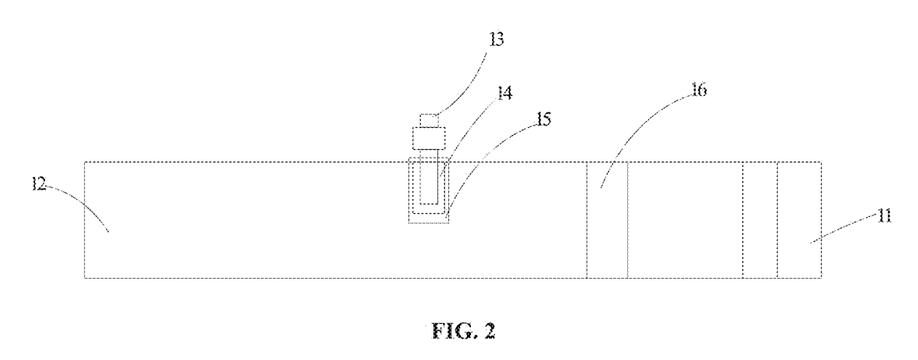
FIG. 2 depicts an exemplary front view of a negative plate of a lithium-ion battery according to one embodiment of the present disclosure.
Figure 4:
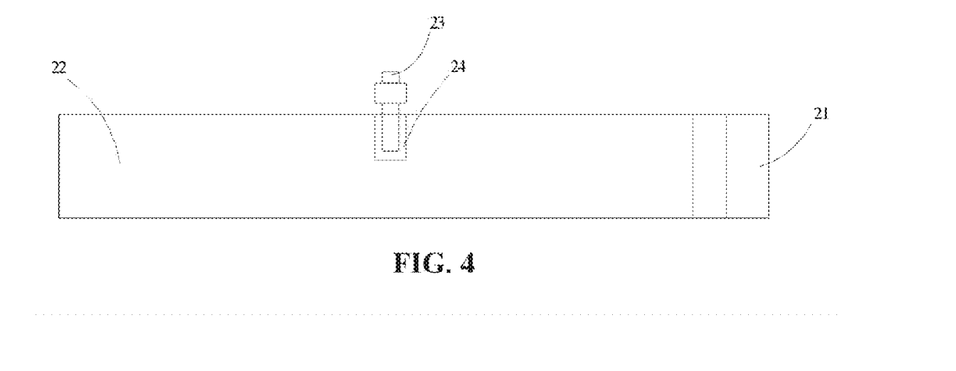
FIG. 4 depicts an exemplary top view of a negative plate of a lithium-ion battery according to one embodiment of the present disclosure.

Preparation of the negative plate:
1) adding 95 wt % negative active material graphite, 2 wt % bonding agent SBR, 1 wt % thickener CMC and 2 wt % conductive agent graphite in solvent deionized water, and obtaining negative slurry having a viscosity of 1000-3000 pa·s after fully stirring;

2) coating the negative slurry on a copper foil having a thickness of 6 μm, after drying and cold pressing, obtaining a negative plate having a compaction density of about 1.6 $g/cm^3$ and a length of 28.5 mm, a width of 77 mm, a thickness of 0.135 mm;

3) removing the negative active material at a center of the negative plate 2 (at a middle portion along a length direction of the negative plate 2) via mechanical cleaning to define a second recess 24, the second recess 24 having a thickness of 0.10 mm, a width of 10 mm and a length of 20 mm;

4) providing a negative lead 23 having a thickness of 0.08 mm, a width of 6 mm and a length of 45 mm, soldering the negative lead 23 in the second recess 24, with the negative lead 23 extending out of the negative plate 2 of 15 mm.

Preparation of the electrolyte: fully mixing a mixture of methyl ethyl carbonate (EMC), diethyl carbonate (DEC), ethylene carbonate (EC) and propylene carbonate (PC) having a weight ratio of 1:1:0.5:0.5; adding $LiPF_6$ as solute and obtaining a base electrolyte containing 1 M $LiPF_6$ adding 0.5 wt % of two fluorine lithium oxalate borate and 1 wt % of adiponitrile in the base electrolyte, and obtaining electrolyte for use in a lithium-ion battery after fully dissolving.

Preparation of the lithium-ion battery: coiling the positive plate 1 and the negative plate 2 with a separator polyethylene film 3 having a thickness of 0.013 mm interposed between the positive plate 1 and the negative plate 2 and obtaining a bared battery cell, with main portion of the bared battery cell having an average thickness of about 2.78 mm; obtaining a final lithium ion battery after drying the bared battery cell, pouring the electrolyte and packaging.

Example 2

Example 2 is almost the same as Example 1, except that:

The distance between a center of the first recess 14 and one end of the positive film 12 (one end of the positive film 12 perpendicular to a length direction of the positive current collector 11 and formed no blank positive current collector 11) is about ¼ of the length of the positive film 12.

The distance between a center of the second recess 24 and one end of the negative film 22 (one end of the negative film 22 perpendicular to a length direction of the negative current collector 21 and formed no blank negative current collector 21) is about ¼ of the length of the negative film 12.

The first recess 14 has a length 75 mm less than a length of the positive lead 13. The first recess 14 has a width 2 mm larger than a width of the positive lead 13. The second recess 24 has a length 75 mm less than a length of the negative lead 23. The second recess 24 has a width 2 mm larger than a width of the negative lead 23.

The first recess 14 has a length 30 mm less than a width of the positive film 12. The second recess 24 has a length 33 mm less than a width of the negative film 22.

The first recess 14 has a depth 0.08 mm larger than a thickness of the positive lead 13. The second recess 24 has a depth 0.08 mmm larger than a thickness of the negative lead 23.

The negative active material is silicon.

Figure 5A:
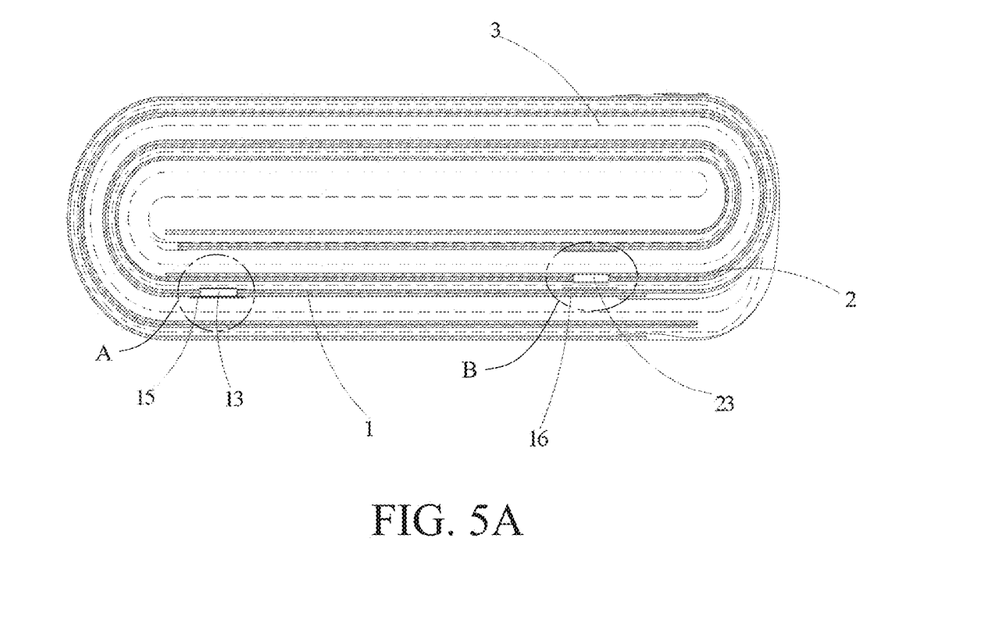
FIG. 5A depicts an exemplary cross-sectional view of a lithium-ion battery according to one embodiment of the present disclosure.
Figure 5B:
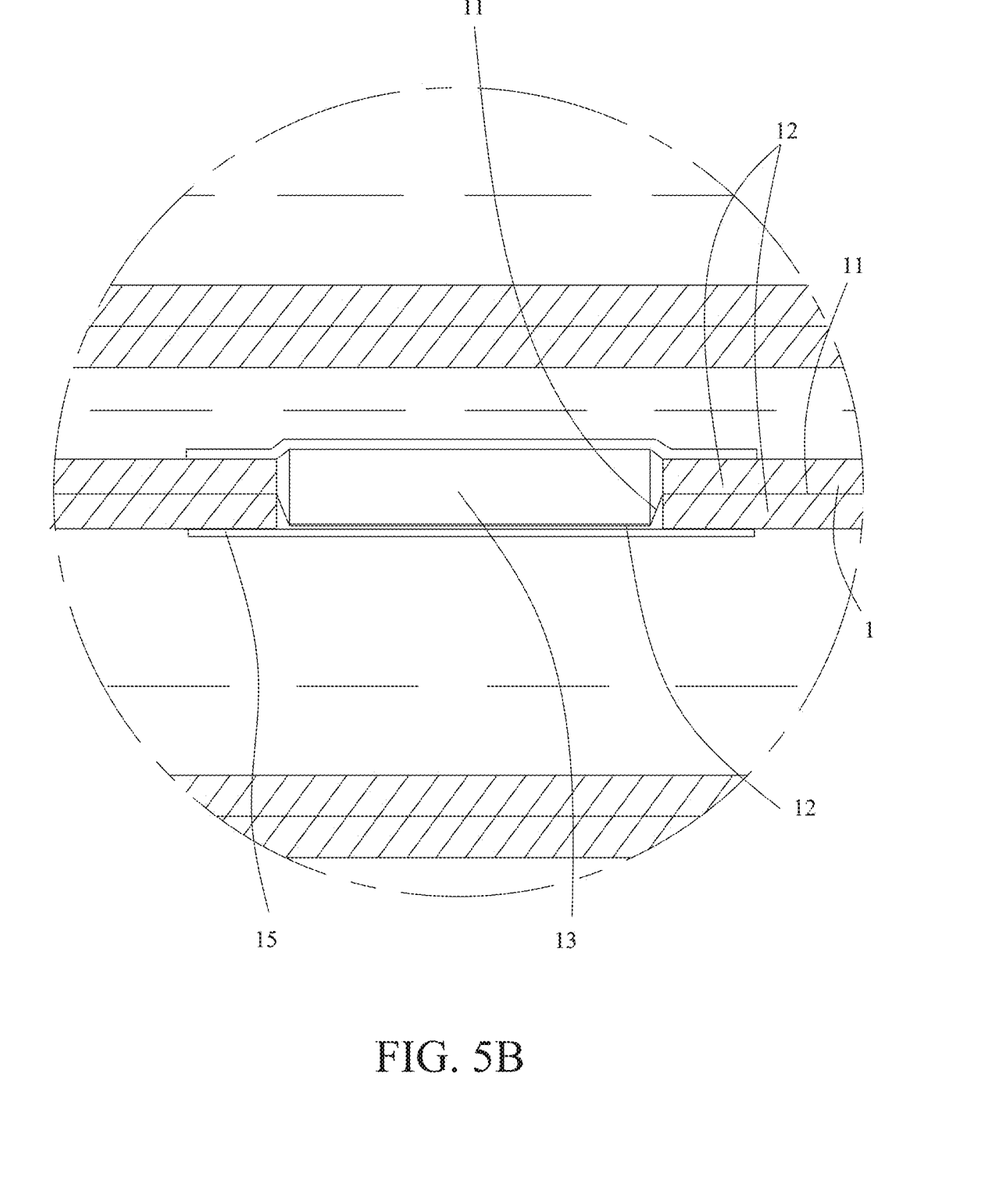
FIG. 5B shows an enlarged view of a portion A of FIG. 5A according to one embodiment of the present disclosure.
Figure 5C:
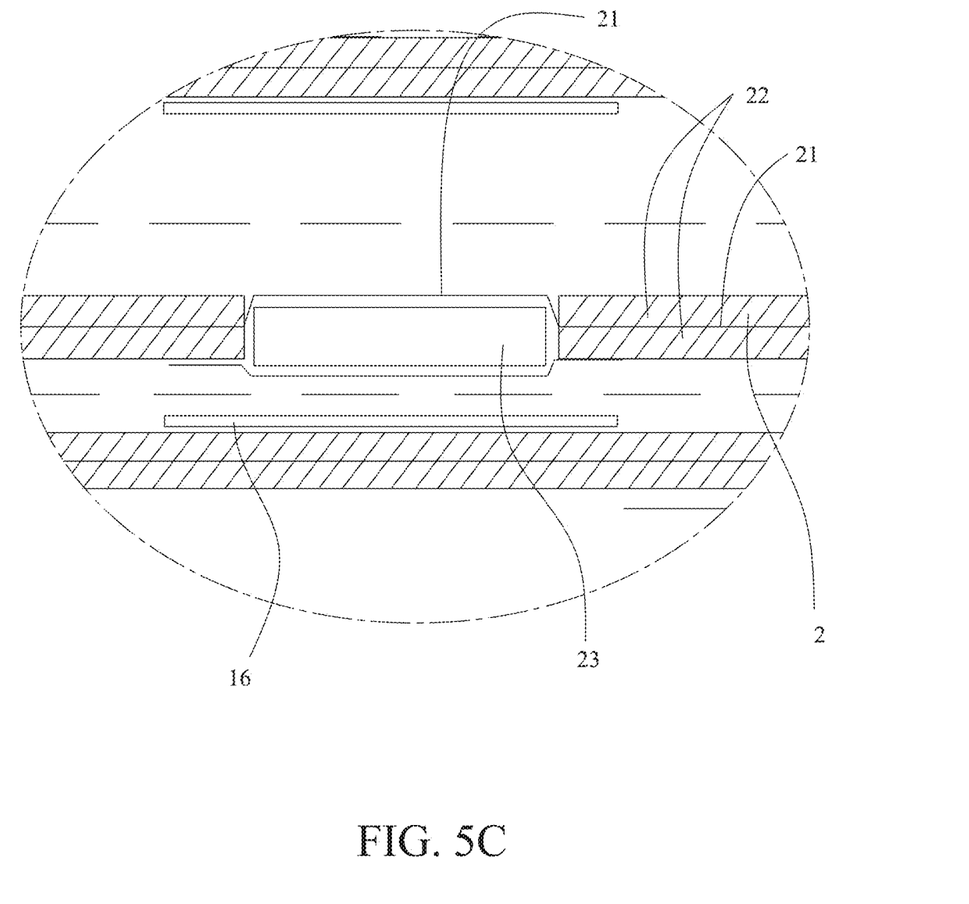
FIG. 5C shows an enlarged view of a portion B of FIG. 5A according to one embodiment of the present disclosure.

The first insulating glue layer 15 and the second insulating glue layer 16 are black insulating glue layers.

Other features of Example 2 are the same as have described in Example 1 and will not be detailed further.

Example 3

Example 3 is almost the same as Example 1, except that:

The distance between a center of the first recess 14 and one end of the positive film 12 (one end of the positive film 12 perpendicular to a length direction of the positive current collector 11 and formed no blank positive current collector 11) is about ¾ of the length of the positive film 12.

The distance between a center of the second recess 24 and one end of the negative film 22 (one end of the negative film 22 perpendicular to a length direction of the negative current collector 21 and formed no blank negative current collector 21) is about ¾ of the length of the negative film 12.

The first recess 14 has a length 50 mm less than a length of the positive lead 13. The first recess 14 has a width 8 mm larger than a width of the positive lead 13. The second recess 24 has a length 50 mm less than a length of the negative lead 23. The second recess 24 has a width 8 mm larger than a width of the negative lead 23.

The first recess 14 has a length 70 mm less than a width of the positive film 12. The second recess 24 has a length 73 mm less than a width of the negative film 22.

The first recess 14 has a depth 0.05 mm larger than a thickness of the positive lead 13. The second recess 24 has a depth 0.05 mm larger than a thickness of the negative lead 23.

The negative active material is silicon.

The first insulating glue layer 15 and the second insulating glue layer 16 are white insulating glue layers.

Other features of Example 3 are the same as have described in Example 1 and will not be detailed further.

Example 4

Example 4 is almost the same as Example 2, except that:

The distance between a center of the first recess 14 and one end of the positive film 12 (one end of the positive film 12 perpendicular to a length direction of the positive current collector 11 and formed no blank positive current collector 11) is about ⅙ of the length of the positive film 12.

The distance between a center of the second recess 24 and one end of the negative film 22 (one end of the negative film 22 perpendicular to a length direction of the negative current collector 21 and formed no blank negative current collector 21) is about ⅙ of the length of the negative film 12.

The first insulating glue layer 15 and the second insulating glue layer 16 are yellow insulating glue layer.

Other features of Example 4 are the same as have described in Example 2 and will not be detailed further.

Example 5

Example 5 is almost the same as Example 3, except that:

The distance between a center of the first recess 14 and one end of the positive film 12 (one end of the positive film 12 perpendicular to a length direction of the positive current collector 11 and formed no blank positive current collector 11) is about ⅘ of the length of the positive film 12.

The distance between a center of the second recess 24 and one end of the negative film 22 (one end of the negative film 22 perpendicular to a length direction of the negative current collector 21 and formed no blank negative current collector 21) is about ⅘ of the length of the negative film 12.

Other features of Example 5 are the same as have described in Example 3 and will not be detailed further.

Comparative Example 1

The Comparative Example 1 is almost the same as Example 1, except that, upper and lower surfaces of the positive lead 13 have no first insulating glue layer 15 formed thereon. The surface of the positive film 12 corresponding to the second recess 24 has no second insulating glue layer 16 pasted thereon.

Other features of Comparative Example 1 are the same as have described in Example 1 and will not be detailed further.

Comparative Example 2

The Comparative Example 2 is almost the same as Example 1, except that, the positive lead 13 is soldered to the blank positive current collector 11, the positive film 12 does not have a first recess 14, the negative lead 23 is soldered to the blank negative current collector 21, the negative film 22 does not have a second recess 24. Other features of Comparative Example 2 are the same as have described in Example 1 and will not be detailed further.

10 lithium-ion batteries are randomly selected from lithium-ion batteries according to Example 1, Example 2, Example 3 and Comparative Example 1 respectively. Each lithium-ion battery is carried out a cycle performance test of 300 cycles. Number of the lithium-ion batteries occurring short circuit is calculated and the testing result is shown in Table 1.

10 lithium-ion batteries are randomly selected from lithium-ion batteries according to Example 1, Example 2, Example 3 and Comparative Example 1 respectively. Each lithium-ion battery is carried out a cycle performance test of 100 cycles. Each lithium-ion battery is disassembled to observe lithium precipitation on the negative plate 2. Number of lithium-ion batteries whose negative plate 2 occurs lithium precipitation is calculated and the testing result is shown in Table 2.

TABLE 1

Short circuit and lithium precipitation on the negative plate occurs to lithium-ion batteries according to Examples 1 to 3 and Comparative Example 1 after cycle test

| Group | Number of batteries occurring short circuit after 300 cycles | Number of batteries occurring lithium precipitation on the negative plate after 100 cycles |
|---|---|---|
| Example 1 | 0 | 0 |
| Example 2 | 0 | 1 |
| Example 3 | 1 | 0 |
| Comparative Example 1 | 5 | 7 |

As clearly shown in Table 1, due to the first insulating glue layer 15 formed on the upper and lower surfaces of the positive lead 13 and the second insulating glue layer 16 pasted on the surface of the positive film 12 corresponding to the second recess 24, the safety performance of the lithium-ion battery can be improved remarkably.

Capacity test, internal resistance test and volumetric energy density test are carried out to the lithium-ion batteries according to Example 1 and Comparative Example 2. The test result is shown in Table 2. The capacity test and internal resistance test are carried out on hang machine at 25° C., the discharge capacity is 0.2 C, the internal resistance is impedance under 1000 Hz, and the volumetric energy density=minimum capacity×platform voltage/maximum volume.

TABLE 2

Capacity, internal resistance and volumetric energy density of lithium-ion batteries according to Example 1 and Comparative Example 2

| Group | DC resistance (mΩ) | Average capacity (mAh) | Average thickness (mm) | Average volumetric energy density(Wh/L) |
|---|---|---|---|---|
| Example 1 | 55 | 1180 | 2.78 | 563 |
| Comparative Example 2 | 62 | 1170 | 2.84 | 546 |

As clearly shown in Table 2, the structure of the positive plate and negative plate according to the present disclosure can overcome uneven thickness of the battery cell, so as to efficiently utilize the space of the lithium-ion battery, improve the capacity and the volumetric energy density of the lithium-ion battery, and reduce the internal resistance of the lithium-ion battery.

Charging and discharging cycle tests are carried out to lithium-ion batteries in accordance with Examples 2 to 5, in which for the sake of illustration, the negative active material in Example 1 is substituted by silicon and referenced as Example 6. The lithium-ion batteries are disassembled after 50 cycles. Abscission of active material at the edge of the second recess 24 is shown in Table 3.

TABLE 3

Abscission of active material at the edge of the second recess after charging and discharging cycle test of lithium-ion batteries according to Examples 2 to 6

| | Example 4 | Example 2 | Example 6 | Example 3 | Example 5 |
|---|---|---|---|---|---|
| Abscission of active material at the second recess after 50 cycles | Obvious abscission of active material | No obvious abscission of active material | No abscission of active material | No obvious abscission of active material | Obvious abscission of active material |

As clearly shown in Table 3, if the negative active material for use in the negative plate 2 is apt to serious volume expansion, such as silicon, the first recess 14 in the center of the positive plate 1 and the second recess 24 in the center of the negative plate 2 can effectively reduce abscission of active material at the edge of the second recess 24. The negative plate 2 adopting silicon as active material undertakes serious volume expansion, which may cause the negative plate 2 defining the second recess at one end thereof, cannot bear the uneven force at the second recess. However, the second recess 24 as describe in Examples 2, 3 and 6 each is located in the center of the negative plate 2. Two ends of the negative plate 2 bear almost the same forces and, therefore, abscission of active material at the edge of the second recess 24 can be improved remarkably.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

What is claimed is:

1. A lithium-ion battery, comprising:
   a positive electrode comprising a positive current collector and a positive electrode active material layer containing lithium cobalt oxide, wherein the positive electrode active material layer is formed on the positive current collector, and the positive electrode active material layer is provided with a first recess accommodating a positive lead being coupled with the positive current collector;
   a negative electrode comprising a negative current collector and a negative electrode active material layer containing graphite or silicon, wherein the negative electrode active material layer is formed on the negative current collector, the negative electrode active material layer being provided with a second recess accommodating a negative lead being coupled with the negative current collector; and the negative lead is disposed on a surface of the negative current collector facing away from the center of the battery; and a portion of the negative current collector where the negative lead is disposed extends towards the center of the battery;

a separator disposed between the positive electrode and the negative electrode; and an electrolyte.

2. The lithium ion battery of claim 1, wherein a distance between a center of the first recess and one end of the positive electrode active material layer is ¼-¾ of a length of the positive electrode active material layer; and a distance between a center of the second recess and one end of the negative electrode active material layer is ¼-¾ of a length of the negative electrode active material layer.

3. The lithium ion battery of claim 1, wherein, the positive lead is disposed on a surface of the positive current collector facing a center of the battery; and a portion of the positive current collector where the positive lead is disposed extends away from the center of the battery.

4. The lithium ion battery of claim 2, wherein the first recess has a length of 1-100 mm less than a length of the positive lead, the first recess has a width of 1-10 mm larger than a width of the positive lead, the second recess has a length of 1-100 mm less than a length of the negative lead, and the second recess has a width of 1-10 mm larger than a width of the negative lead.

5. The lithium ion battery of claim 1, wherein the first recess has a length of 1-100 mm less than a width of the positive electrode active material layer, and the second recess has a length of 1-100 mm less than a width of the negative electrode active material layer.

6. The lithium ion battery of claim 1, wherein the first recess has a depth of 0.005-0.1 mm larger than a thickness of the positive lead, and the second recess has a depth of 0.005-0.1 mm larger than a thickness of the negative lead.

7. The lithium ion battery of claim 1, wherein a length of a portion of the positive lead in the first recess is less than a width of a remaining portion of the positive electrode active material layer from an edge of a first insulating glue layer covering the positive electrode active material layer to an edge of the positive electrode active material layer opposite to the first recess.

8. The lithium ion battery of claim 1, wherein a width of a portion of the positive lead in the first recess is greater than a width of a remaining portion of the first recess not occupied by the positive lead located on one side of the positive lead.

9. The lithium ion battery of claim 1, wherein a surface of the positive current collector corresponding to the positive lead is covered with a third insulating glue layer.

10. The lithium ion battery of claim 1, wherein a top surface of the positive lead is provided with a first insulating glue layer, a surface of the positive electrode active material layer corresponding to the second recess is pasted with a second insulating glue layer, the second insulating glue layer has a width larger than a width of the second recess, and the second insulating glue layer has a length larger than a length of the second recess.

11. A lithium ion battery, comprising:
a positive electrode, comprising a positive current collector and a positive electrode active material layer being formed on the positive current collector, wherein the positive electrode active material layer is provided with a first recess accommodating a positive lead being coupled with the positive current collector;
a negative electrode, comprising a negative current collector and a negative electrode active material layer being formed on the negative current collector, wherein the negative electrode active material layer is provided with a second recess accommodating a negative lead being coupled with the negative current collector; and the negative lead is disposed on a surface of the negative current collector facing away from the center of the battery; and a portion of the negative current collector where the negative lead is disposed extends towards the center of the battery;
a separator disposed between the positive electrode and the negative electrode; and
an electrolyte.

12. The lithium ion battery of claim 11, wherein a distance between a center of the first recess and one end of the positive electrode active material layer is ¼-¾ of a length of the positive electrode active material layer, and a distance between a center of the second recess and one end of the negative electrode active material layer is ¼-¾ of a length of the negative electrode active material layer.

13. The lithium ion battery of claim 11, wherein the positive lead is disposed on a surface of the positive current collector facing a center of the battery; and a portion of the positive current collector where the positive lead is disposed extends away from the center of the battery.

14. The lithium ion battery of claim 11, wherein the first recess has a length of 1-100 mm less than a length of the positive lead, the first recess has a width of 1-10 mm larger than a width of the positive lead, the second recess has a length of 1-1.00 mm less than a length of the negative lead, and the second recess has a width of 1-10 mm larger than a width of the negative lead.

15. The lithium ion battery of claim 11, wherein the first recess has a length of 1-100 mm less than a width of the positive electrode active material layer, and the second recess has a length of 1-100 mm less than a width of the negative electrode active material layer.

16. The lithium ion battery of claim 11, wherein the first recess has a depth of 0.005-0.1 mm larger than a thickness of the positive lead, and the second recess has a depth of 0.005-0.1 mm larger than a thickness of the negative lead.

17. The lithium ion battery of claim 11, wherein a length of a portion of the positive lead in the first recess is less than a width of a remaining portion of the positive electrode active material layer from an edge of a first insulating glue layer covering the positive electrode active material layer to an edge of the positive electrode active material layer opposite to the first recess.

18. The lithium ion battery of claim 11, wherein a width of a portion of the positive lead in the first recess is greater than a width of a remaining portion of the first recess not occupied by the positive lead located on one side of the positive lead.

19. The lithium ion battery of claim 11, wherein a first location of a top surface of the positive lead is provided with a first insulating glue layer; a second location of a surface of the positive electrode active material layer corresponding to the second recess is pasted with a second insulating glue layer; and a third location of a surface of the positive current collector corresponding to the positive lead is covered with a third insulating glue layer.

20. The lithium ion battery of claim 19, wherein the second insulating glue layer has a width larger than a width of the second recess, and the second insulating glue layer has a length larger than a length of the second recess.

* * * * *